(12) United States Patent
Doo

(10) Patent No.: US 7,812,988 B2
(45) Date of Patent: Oct. 12, 2010

(54) IMAGE TRANSMISSION METHOD AND MOBILE COMMUNICATION TERMINAL FOR IMPLEMENTING THE SAME

(75) Inventor: Mae Kyun Doo, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 999 days.

(21) Appl. No.: 11/510,589

(22) Filed: Aug. 28, 2006

(65) Prior Publication Data

US 2007/0047018 A1 Mar. 1, 2007

(30) Foreign Application Priority Data

Aug. 26, 2005 (KR) ...................... 10-2005-0079038

(51) Int. Cl.
*G06F 3/12* (2006.01)
*H04N 7/14* (2006.01)
*H04N 1/40* (2006.01)
*H04N 1/00* (2006.01)
*H04N 1/387* (2006.01)
*H04M 11/00* (2006.01)

(52) U.S. Cl. ...................... 358/1.15; 358/448; 358/401; 358/450; 358/462; 348/14.01; 379/88.13

(58) Field of Classification Search .................. 358/1.9, 358/540, 1.15, 448, 401, 450, 462; 379/1.02, 379/88.13; 348/14.01
See application file for complete search history.

(56) References Cited

U.S. PATENT DOCUMENTS

| 5,761,339 | A | * | 6/1998 | Ikeshoji et al. | ............... 382/176 |
| 7,355,619 | B2 | * | 4/2008 | Motohashi | ............... 348/14.02 |
| 2005/0078804 | A1 | * | 4/2005 | Yomoda | ................... 379/1.02 |
| 2006/0001758 | A1 | * | 1/2006 | Nam et al. | ............. 348/333.12 |
| 2008/0032670 | A1 | * | 2/2008 | Wada et al. | ............... 455/412.1 |

FOREIGN PATENT DOCUMENTS

| CN | 1387078 A | 12/2002 |
| CN | 1617561 A | 5/2005 |
| JP | 1995-273968 A | 10/1995 |
| JP | 2005-117527 A | 4/2005 |
| JP | 2005-151073 A | 6/2005 |
| KR | 10-2003-0008728 A | 1/2003 |
| KR | 10-2005-0014285 A | 2/2005 |

\* cited by examiner

*Primary Examiner*—Charlotte M Baker
(74) *Attorney, Agent, or Firm*—Birch, Stewart, Kolasch & Birch, LLP

(57) ABSTRACT

An image transmission method and a mobile communication terminal for implementing the same are disclosed. The image transmission method for the mobile communication terminal includes preparing a picture image; preparing a character image composed of a character part and a background part; synthesizing, by the mobile terminal, the character image and the picture image to produce a synthesized image; and transmitting the synthesized image.

12 Claims, 5 Drawing Sheets

(2-1)

(2-2)

(2-3)

(2-4)

(a)

(b)

IMAGE TRANSMISSION METHOD AND MOBILE COMMUNICATION TERMINAL FOR IMPLEMENTING THE SAME

This application claims the priority benefit of Korean Patent Application No. 10-2005-0079038, filed on Aug. 26, 2005, which is hereby incorporated by reference as if fully set forth herein.

BACKGROUND OF THE INVENTION

1. Field of the Invention

The present invention relates to a mobile communication terminal, and more particularly to a mobile communication terminal capable of transmitting a picture image.

2. Discussion of the Related Art

In recent times, with the increasing development of information communication technologies, information and communication environments have been abruptly changed. Particularly, mobile communication terminals have been considered to be requisites for modern society, and have been widely used throughout the world. With the increasing demands of users due to the widespread use of the above-mentioned mobile communication terminals, not only a general voice call function, but also a variety of functions (e.g., a video call function or video telephony function, etc.) have been added to the mobile communication terminals.

Typically, a video call (also called a video telephony) function allows a caller and a called party to communicate with each other simultaneously while viewing their facial images via displays contained in their terminals.

In more detail, a terminal of the caller captures a facial image of the caller who communicates with the called party, transmits the captured facial image to a terminal of the called party, receives a facial image of the called party from the terminal of the called party, and displays the received facial image of the called party. As a result, the caller and the called party can intimately communicate with each other simultaneously while viewing the other party's facial images on their terminals.

However, the conventional mobile communication terminal of the caller or the called party can transmit only the captured image of the caller or the called party with no change, and cannot synthesize a specific character on the captured image of the caller or the called party. That is, the conventional mobile communication terminal cannot transmit a synthesized image to the terminal of the other party, e.g., the caller or the called party, which would be beneficial to provide sophisticated image transmissions. Therefore, there is a need for an improved mobile communication terminal that can synthesize the specific character(s) on the captured image of the caller or the called party and transmit such synthesized image to the other terminal.

SUMMARY OF THE INVENTION

Accordingly, the present invention is directed to an image transmission method and a mobile communication terminal for implementing the same that substantially obviates or addresses one or more problems due to limitations and disadvantages of the related art.

An object of the present invention is to provide a mobile communication terminal for synthesizing a specific character on a facial image of a caller or a called party during a video call mode, and transmitting the synthesized resultant image, and to provide an image transmission method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image transmission method for a mobile communication terminal comprises: preparing a picture image; preparing a character image composed of a character part and a background part; synthesizing the character image and the picture image by filling the background part of the character image with the picture image such that the character part of the character image is inserted into the picture image; and transmitting the synthesized image.

In another aspect of the present invention, there is provided a mobile communication terminal comprising: an image synthesizing module for, in order to synthesize a character image composed of a character part and a background part and a picture image, filling the background part of the character image with the picture image such that the character part of the character image is inserted into the picture image; and a transmission module for transmitting the synthesized image.

In another aspect of the present invention, there is provided an image transmission method for a mobile communication terminal, the method comprising: preparing a picture image; preparing a character image composed of a character part and a background part; synthesizing, by the mobile terminal, the character image and the picture image to produce a synthesized image; and transmitting the synthesized image.

In another aspect of the present invention, there is provided a mobile communication terminal comprising: an image synthesizing module configured to synthesize a character image composed of a character part and a background part, with a picture image to produce a synthesized image, by filling the background part of the character image with the picture image such that the character part of the character image is inserted into the picture image; and a transmission module configured to transmit the synthesized image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
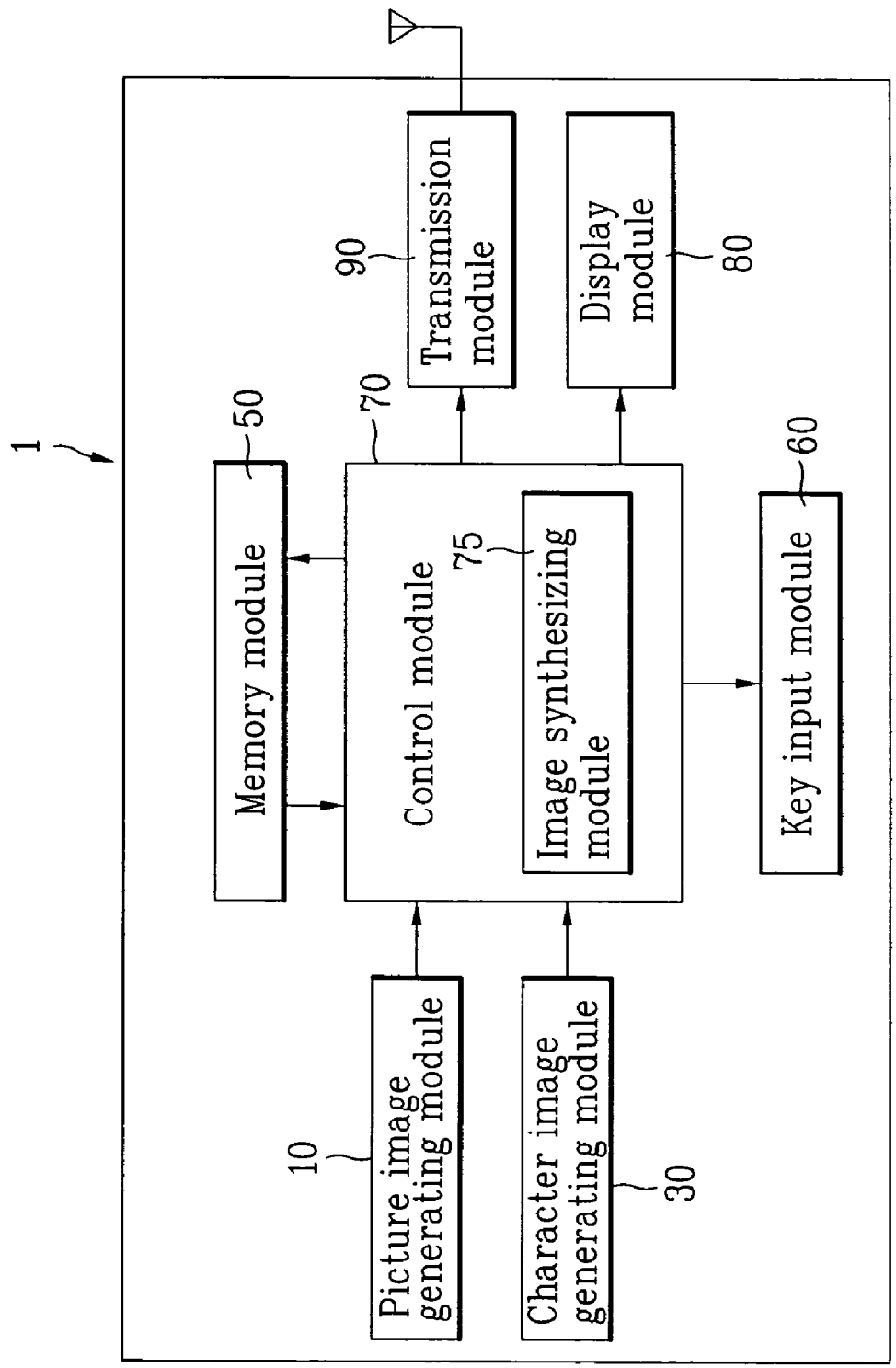
FIG. 1 is a block diagram illustrating a mobile communication terminal according to the present invention.

FIG. 1 is a block diagram illustrating a mobile communication terminal according to the present invention.

Referring to FIG. 1, the mobile communication terminal 1 according to the present invention includes a picture image generating module 10, a character image generating module 30, a memory module 50, a key input module 60, a control module 70, an image synthesizing module 75, a display module 80, and a transmission module 90, etc. All the components of the mobile communication terminal 1 are operatively coupled and configured.

Needless to say, the mobile communication terminal 1 according to the present invention may include not only the above-mentioned components but also other constituent components (e.g., a voice communication module (not shown), etc.), but the above-mentioned other constituent components are not directly related to the present invention, such that their detailed description will herein be omitted for the sake of brevity.

The picture image generating module 10 generates a picture image to be transmitted from a caller (i.e., a user of the terminal according to the present invention) to a called party (one or more terminals).

Preferably, the picture image generating module 10 may include a camera (not shown) contained in the terminal, and may capture a facial image of the caller (or other image desired by the caller) using the camera, such that the picture image of the caller is formed. The picture image generating module 10 may receive an image captured by an external camera (not shown) via a terminal I/O port (not shown), and may use the received image as the picture image.

The picture image may be configured in the form of a still image or a moving image. Preferably, it is preferable that the picture image is configured in the form of the moving image for intimacy with another party such as the called party. Also, before the caller establishes a call-connection state with the called party (call recipient), the picture image generating module 10 creates the picture images, and stores the created picture image in the memory module 50, such that the stored picture image may be used during the call connection time for the call between the called and the called party (or parties).

The character image generating module 30 creates a character image to be synthesized with the picture image. The character image generating module 30 provides the screen of the display module 80 with a window for writing a desired character. If the terminal user enters a desired character in the window using the key input module 60 (e.g., a keypad, a keyboard, a touch sensitive screen, etc.), the character is converted into a character image composed of both a character part to be suitably synthesized with the picture image and a background part (which will be described later).

A method for entering the character to be converted into the character image via the window for writing the character according to the present invention will hereinafter be described with reference to FIG. 2.

Figure 2:
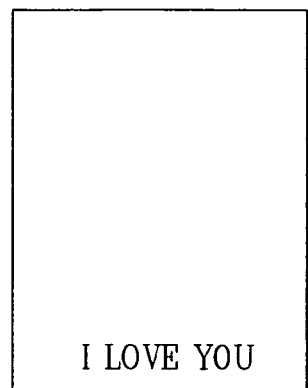
FIG. 2 exemplarily shows windows for writing a character to be displayed during a character input mode according to the present invention.
Figure 2:
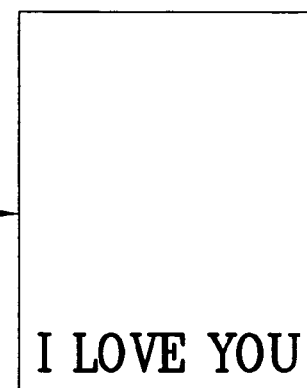
Figure 2:
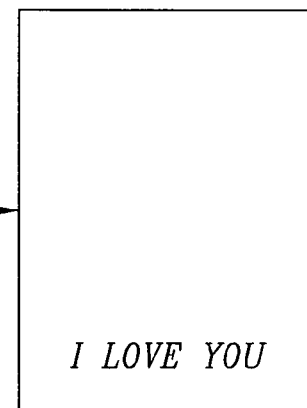
Figure 2:
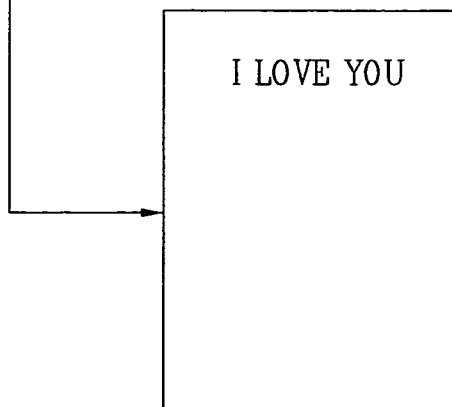

FIG. 2 exemplarily shows windows for writing a character to be displayed during a character input mode.

Referring to FIG. 2, the terminal user can enter a desired character (e.g., a letter, a symbol, a number, a sign, etc.) into the window for writing the character as shown in FIG. 2 (2-1). The window can be a window on the screen of the display module 80. The terminal user may change at least one of the character size (See FIG. 2 (2-2)), the color (not shown), the font of the character (See FIG. 2 (2-3)), and the location of the character within the window (See FIG. 2 (2-4)), using predetermined setup information either before the character input operation or the editing operation after the character input operation.

The input character may be stored in the memory module 50 in the form of a text file. The input character may be converted into a character image, such that it may be stored in the memory module 50 in the form of an image file.

The character image generating module 30 loads the character configured in the form of a text file, and converts the loaded character into a character image to be synthesized with the picture image. As an alternative, the character image generating module 30 may load the character image configured in the form of the image file, and may synthesize the loaded character image with the picture image.

In the meantime, the terminal 1 may receive an additional text file or an additional character image file from an external part/device via the terminal I/O port of the terminal 1, stores the received file in the memory module 50, and may use the stored file as a character image to be synthesized with the picture image.

The memory module 50 stores a variety of data and programs for the terminal 1, which can be provided from a user. Specifically, the memory module 50 may store the text file(s) and/or the character image file(s), and may store the picture image file(s).

The key input module 60 is used to enter desired information or command into the terminal 1. Specifically, the key input module 60 may enter a character in the window for writing the character. Here, the character can be, but is not limited to, a letter, a symbol, a number, etc.

The control module 70 controls the terminal 1. The control module 70 includes the image synthesizing module 75. The image synthesizing module 75 will be described in association with the image synthesizing method according to the present invention. The image synthesizing module 75 and the control module 70 may be separated from each other.

The transmission module 90 transmits the picture image synthesized with the character image to the terminal of the called party or another party.

Figure 3:
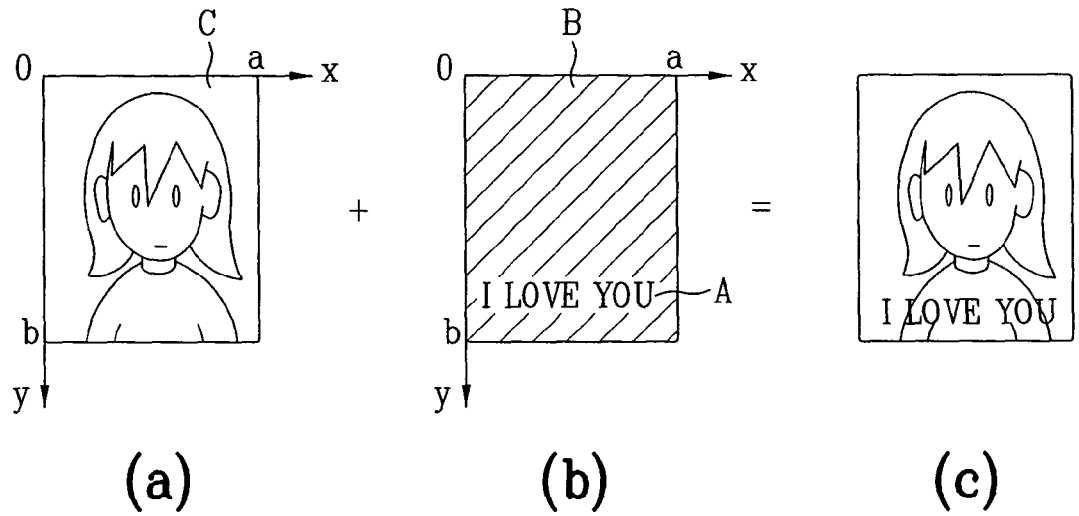
FIGS. 3(*a*)-3(*c*) show respectively a character image, a picture image, and a synthesized image of the character image and the picture image according to the present invention.

The image synthesizing method for use in a mobile communication terminal according to the present invention will hereinafter be described with reference to FIGS. 3~4. This method can be implemented by the terminal 1 of FIG. 1 or by other suitable device.

FIGS. 3(a), 3(b) and 3(c) respectively show examples of a character image, a picture image, and a synthesized image of the character image and the picture image according to the present invention. FIG. 4 is a flow chart illustrating a method for synthesizing an image for use in a mobile communication terminal according to the present invention.

Figure 4:
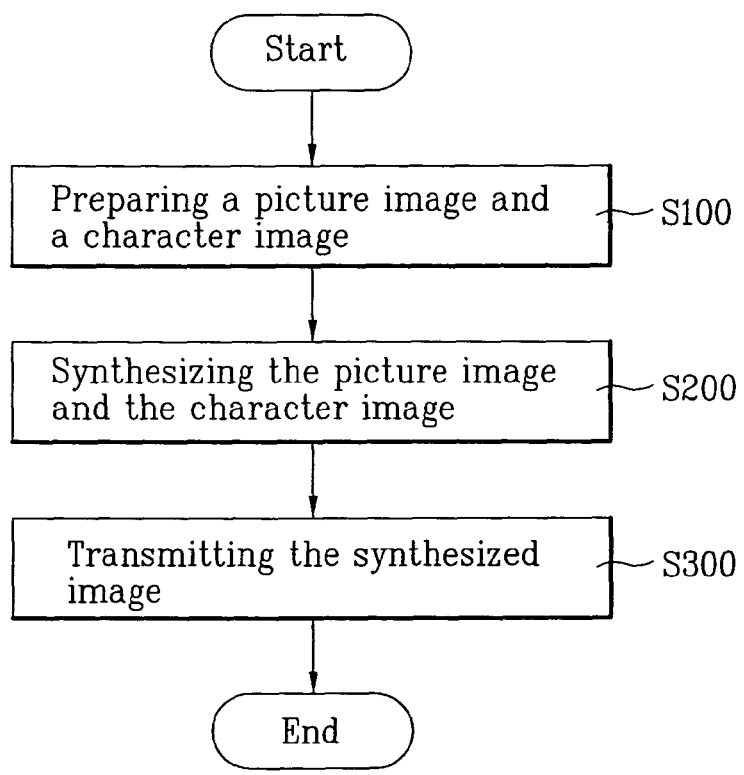
FIG. 4 is a flow chart illustrating a method for synthesizing an image for use in a mobile communication terminal according to the present invention.

Firstly, a picture image C to be transmitted for the called party (call recipient) is prepared by the picture image generating module 10 as shown in FIG. 3(a) [S100 in FIG. 4].

Then, a character image to be synthesized with the picture image C is formed by the character image generating module 30 [S100 in FIG. 4].

According to one embodiment, the character image should coincide with the following condition so as to be synthesized with the picture image. As shown in FIG. 3(b), the character image includes the character part A and the background part B. Preferably, the background part B is composed of a single color, and the character image A is composed of a single or several colors other than the color of the background part B. Then, the image synthesizing module 75 synthesizes the picture image and the character image [S200 in FIG. 4]. The image synthesizing module 75 fills the background part B composed of preferably a single color with the picture image C, such that the character image is synthesized with the picture image.

In other words, the image synthesizing module 75 matches the character image with the picture image on a one-to-one basis for each pixel, such that a pixel of the background part B composed of the single color is replaced with a pixel of the picture image C (i.e., the character part A other than the background part B is inserted into the picture image C), resulting in the implementation of the synthesized image.

A detailed operation of the method for synthesizing the picture image and the character image according to an embodiment of the present invention will hereinafter be described with reference to FIG. 5. This method can be implemented by the terminal 1 of FIG. 1 or by other suitable device.

Figure 5:
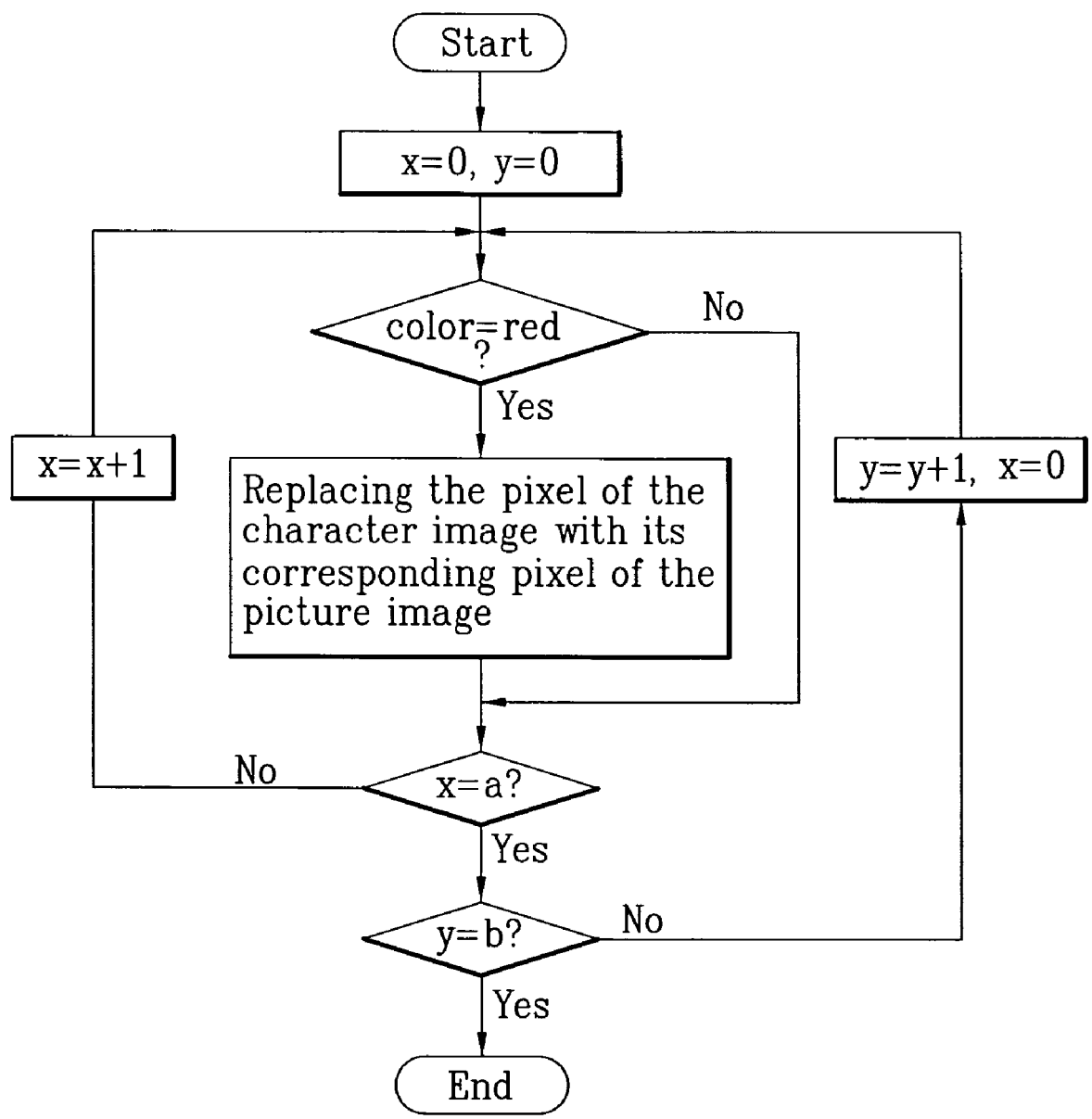
FIG. 5 is a flow chart illustrating a detailed operation of the image synthesizing step shown in FIG. 4 according to the present invention.

FIG. 5 is a flow chart illustrating a detailed operation of the image synthesizing step (200) shown in FIG. 4 according to the present invention. As an example used to explain the method, it is assumed that the background part of the character image in FIG. 3(b) is set to be in red color.

Referring to FIG. 5, the image synthesizing module 75 checks each pixel of the character image (See FIG. 3(b)) in the directions of an X-axis ($0 \leq x \leq a$) and a Y-axis ($0 \leq y \leq b$), incrementally, such that it determines whether or not the color of each checked pixel is red.

For each pixel, if the pixel of the character image is colored red, the red pixel (i.e., the pixel is a pixel of the background part of the character image) is replaced with a pixel of the picture image corresponding to the red pixel. However, if the pixel of the character image is not colored red (i.e., the pixel is a pixel of the character part A of the character image), the pixel is not replaced with the pixel of the picture image corresponding to the pixel, and thus the pixel of the character part A is kept in the image. By the selective replacement of the pixels, the picture image C is combined with the character part A of the character image to produce a synthesized image as shown in FIG. 3(c).

The flow chart shown in FIG. 5 will be readily understood by those skilled in the art, such that its detailed description will herein be omitted for the convenience of description.

Figure 6:
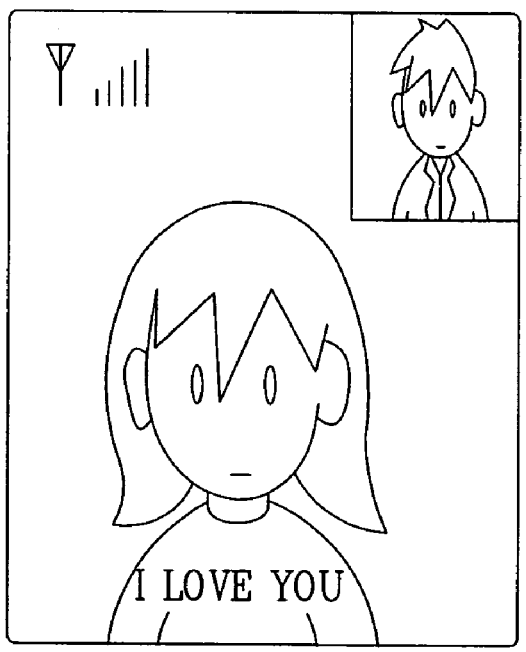
FIGS. 6(a) and 6(b) show exemplary images of a video call mode of a mobile communication terminal according to the present invention.
Figure 6:
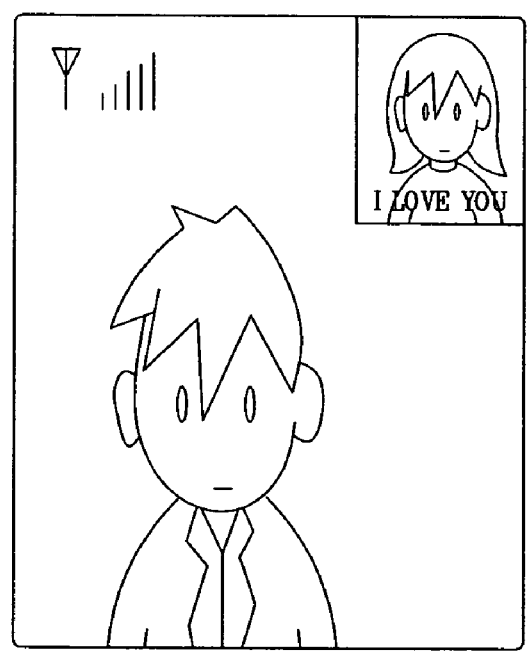

Returning to FIG. 4, finally, the synthesized image of the caller is transmitted to the called party (or other desired party) via the transmission module 90 [S300 in FIG. 4]. The synthesized image of the caller is displayed on a terminal of the called (or another) party as shown in FIG. 6(a). Optionally, the picture image or a synthesized image of the called party can be displayed on some part of the display of the terminal of the called party as shown in FIG. 6(a), such that the called party can confirm the image transmitted to the caller. Similarly, as shown in FIG. 6(b), simultaneous with the displaying of the images on the called party's terminal, the picture image (or the synthesized image) of the called party with or without a smaller version of the synthesized image (or the picture image) of the caller can be displayed on the terminal of the caller.

As apparent from the above description, the image transmission method and a mobile communication terminal for implementing the same according to the present invention can transmit an image formed by synthesizing the caller's facial or other image with specific character(s), to a called party and vice versa, such that the caller can intimately communicate with the called party during the call while viewing the image of the called party and vice versa.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image transmission method for a mobile communication terminal, the method comprising:
   capturing, via a camera on the mobile terminal, a picture image of a user of the mobile terminal to be transmitted to another terminal during a video call;
   receiving, via an input unit, characters to be synthesized within the picture image;
   preparing, via a controller on the mobile terminal, a character image composed of a character part including the input characters and a background part;
   synthesizing, by the controller, the character image and the picture image to produce a synthesized image; and
   transmitting, via a wireless communication unit, the synthesized image to said another terminal during the video call,
   wherein the background part is in a single color,
   wherein the synthesizing step includes filling the background part of the character image with the picture image such that the character part of the character image is inserted into the picture image, and
   wherein the synthesizing step includes matching the character image with the picture image on a one-to-one basis for each pixel and replacing only each pixel of the background part with a pixel of the picture image corresponding to the pixel.

2. The method according to claim 1, wherein the character image preparing step includes:
   providing a window for entering a desired character;
   entering a character into the window; and
   converting the character into the character image.

3. The method according to claim 2, wherein the character entering step includes:
   adjusting at least one of a size, a color, and a font of the entered character, and a character location within the window.

4. The method according to claim 2, wherein the character preparing step includes storing the character written in the window.

5. The method according to claim 4, wherein the character is stored in the form of a text file.

6. The method according to claim 4, wherein the character entering step includes loading the character stored in the mobile communication terminal, and entering the character into the window.

7. A mobile communication terminal comprising:
a camera configured to capture a picture image of a user of the mobile terminal to be transmitted to another terminal during a video call;
an input unit configured to input characters to be synthesized within the picture image;
a controller configured to prepare a character image composed of a character part including the input characters and a background part, and to synthesize the character image and the picture image to produce a synthesized image, by filling the background part of the character image with the picture image such that the character part of the character image is inserted into the picture image; and
a transmission module configured to transmit the synthesized image to said another terminal,
wherein the background part is in a single color, and
wherein the controller is further configured to synthesize the character image and the picture image by matching the character image with the picture image on a one-to-one basis for each pixel and replacing only each pixel of the background part with a pixel of the picture image corresponding to the pixel.

8. The mobile communication terminal according to claim 7, further comprising:
a character image generating module configured to provide a window for entering a character, and converting the character entered into the window into the character image.

9. The mobile communication terminal according to claim 8, wherein the character image generating module allows a user to adjust at least one of a size, a color, and a font of the entered character, and a character location within the window.

10. The mobile communication terminal according to claim 8, further comprising:
a memory module configured to store the character entered into the window.

11. The mobile communication terminal according to claim 10, wherein the character is stored in the form of a text file.

12. The mobile communication terminal according to claim 10, wherein the character image generating module loads the character stored in the memory module, and enters the character in the window.

* * * * *